United States Patent [19]

Schulte et al.

[11] 4,141,470

[45] Feb. 27, 1979

[54] MIXING HEAD FOR MIXING AT LEAST TWO REACTIVE COMPONENTS

[75] Inventors: Klaus Schulte; Heinrich Ersfeld, both of Leverkusen, Fed. Rep. of Germany

[73] Assignee: Bayer Aktiengesellschaft, Leverkusen, Fed. Rep. of Germany

[21] Appl. No.: 775,088

[22] Filed: Mar. 7, 1977

[30] Foreign Application Priority Data

Mar. 25, 1976 [DE] Fed. Rep. of Germany ....... 2612812

[51] Int. Cl.² .............................................. G01F 11/06
[52] U.S. Cl. .................... 222/137; 141/107; 222/564; 425/130; 425/257
[58] Field of Search .............. 222/136, 137, 145, 149, 222/309, 322, 380, 409, 561, 564; 141/107; 425/257, 130

[56] References Cited

U.S. PATENT DOCUMENTS

| 60,104 | 11/1866 | Wiles | 222/380 X |
| 3,101,161 | 8/1963 | Ivarson | 222/309 X |
| 3,706,515 | 12/1972 | Keuerleber et al. | 425/257 X |
| 3,975,128 | 8/1976 | Schluter | 222/136 X |
| 4,073,408 | 2/1978 | Hartwig | 222/145 |

FOREIGN PATENT DOCUMENTS

2071220 9/1971 France ..................................... 222/380

*Primary Examiner*—Allen N. Knowles
*Assistant Examiner*—Fred A. Silverberg
*Attorney, Agent, or Firm*—Gene Harsh; Joseph C. Gil; R. Brent Olson

[57] ABSTRACT

The instant invention is directed to a mixing head for mixing reactants preferably for the production of foam. The mixing head is characterized as having a housing in which an ejector piston is guided, the guide bore of said piston being crossed by a guide bore for a restrictor slide which has a passage for the ejector piston, an outlet element being situated immediately subjacent to said passage, and, in the most preferable embodiment, the restrictor slide and ejector piston being connected to a control device.

5 Claims, 5 Drawing Figures

MIXING HEAD FOR MIXING AT LEAST TWO REACTIVE COMPONENTS

BACKGROUND OF THE INVENTION

This invention relates to a mixing head for mixing at least two components which react together, preferably to form a foam, comprising a housing in which is arranged a guide bore for an ejector piston, one section of the bore forming a mixing chamber into which inlet apertures open for the components, one end of the mixing chamber being bounded by the end face of the ejector piston when the piston is withdrawn, the outlet aperture being arranged at the opposite end of the mixing chamber.

Mixing heads of this kind generally operate on the counterflow injection principle, i.e., the injection apertures, which are in the form of nozzles or perforated plates, are situated opposite one another.

To achieve thorough mixing, a certain pressure must be maintained within the mixing chamber. This pressure is difficult to measure because of the small volume of the mixing chamber. It is therefore generally based on the theoretical velocity of the reaction mixture leaving the mixing chamber. It has been found, for example, that for the production of foams based on polyurethane, a sufficient intensity of mixing is ensured if the mixture is discharged at the rate of 20 to 40 meters per second. In the known mixing heads, pressure in the mixing chamber is produced by means of swirl elements or perforated shields placed in the outlet element behind the mixing chamber.

Since these mixing heads are generally used for filling molds with reaction mixture, it is necessary to ensure that the mixture leaves the mixing chamber in a quiet, steady flow so that it enters the cavity of the mold in a laminar stream. The purpose of this requirement is to obtain a closed flow front and ensure that no air bubbles are beaten into the mixture as these could give rise to faults in the finished molded product. This laminar flow is obtained generally by means of deflecting and calming zones arranged in the outlet elements. Such mixing heads with fittings installed in the outflow elements must, however, be flushed with solvent or compressed air. The residues of reaction mixture thereby removed as waste, pollute the surroundings.

New, positively controlled mixing heads advantageously operate without the use of rinsing fluids since the residues of reaction mixture left in the mixing chamber are ejected by means of an ejector piston towards the end of the mold-filling operation. In this case, it is just as impossible to adapt the pressure in the mixing chamber to the prevailing requirements as it is to ensure a laminar flow from the mixing chamber into the mold cavity.

Since mixing cannot be achieved with the required intensity, attempts have also been made to provide aftermixers between the mixing chamber and the cavity of the mold. These devices do improve mixing and calm the turbulent stream of mixture leaving the mixing chamber. Both the aftermixers and the sprue channel are placed in the plane of separation of the mold. When the product has hardened, the mixture left in the sprue channel and aftermixer must be removed from the mold as waste. The sprue mark left on the molded article is a blemish and must be removed.

Another design of mixing head has an ejector piston which can be pushed forwards as far as the outlet aperture of the mixing chamber towards the end of the mold filling process, and this outlet aperture is directly adjacent to the mixing chamber. It is therefore possible to produce moldings free from sprue marks. Due to the inefficient mixing process, however, the products have defects in the form of streaks and bubbles.

It is therefore an object of the present invention to provide a mixing head which ensures sufficiently vigorous mixing by virtue of the fact that the pressure in the mixing head is adjustable, and which can be operated without the use of rinsing fluid and enables the mixture to enter the mold cavity as a laminar stream and ensures production free from waste.

DESCRIPTION OF THE INVENTION

According to the invention, there is provided a mixing head for mixing at least two components which react with each other, preferably to form a foam, comprising a housing having a guide bore for an ejector piston, a section of the guide bore forming a mixing chamber into which inlet apertures for the components open, one end of the mixing chamber being bounded by the end face of the ejector piston when the piston is withdrawn, an outlet opening being situated at the opposite end of the mixing chamber, a restrictor slide slidable in a guide bore, the guide bore being adjacent the outlet of the mixing chamber and arranged transversely relative thereto, the restrictor slide having a passage therethrough, the cross-section of which is at least equal to the cross-section of the ejector piston, the passage connecting the mixing chamber to an outflow conduit in every position of the restrictor slide, the internal cross-section of the outflow conduit being at least equal to the cross-section of the ejector piston. More particularly, the instant invention is directed to a mixing head for mixing at least two reactive components comprising:

(A) A housing having
   (i) an ejector piston guide bore therein,
   (ii) a mixing chamber within said ejector piston guide bore and into which inlet apertures for said reactive components open, said mixing chamber further defined as having an inlet opening and an outlet opening,
   (iii) a restrictor piston guide bore arranged transversely of said outlet opening,
   (iv) an outflow bore arranged transversely of said restrictor piston guide bore, and communicating with said outlet opening via said restrictor piston guide bore;
(B) An ejector piston slidably located in said ejector piston guide bore, and slidable through said mixing chamber, said restrictor piston guide bore, and said outflow bore;
(C) A restrictor piston slidably located in said restrictor piston guide bore, and having a passage therethrough, said passage adapted to directly connect said outlet opening to said outflow bore, and said passage being of
(C) such a cross-section that said ejector piston can pass therethrough.

Adjustment of the pressure of the mixing chamber is preferably achieved by adjustment of the stroke of the restrictor slide so that the outlet aperture of the mixing chamber, i.e., the cross-section of flow between the passage of the restrictor slide and the surrounding wall of the guide bore of the slide, is variable.

This passage at the same time provides for efficient after-mixing because the material is injected at a high flow velocity into this passage which is shifted laterally with respect to the axis of the mixing chamber so that a powerful turbulence is produced, but the flow velocity immediately drops due to the increase in cross-section. In the outflow element, the flow velocity is finally so greatly reduced, i.e., to about 1 to 2 meters per second, that the desired laminar flow is obtained.

Operation without flushing medium and hence without loss of material is made possible by the ejector piston which empties the mixing chamber at the end of the filling process and, when the restrictor slide has been moved to the required position, is pushed through the passage of the slide to reach the outlet aperture of the outflow element. The passage of the slide at the same time has a calming effect on the mixture stream, and the outflow element ensures that the mixture will enter the mold cavity as a laminar stream. The synchronization of the restrictor slide and ejector piston can be achieved by means of an electric, hydraulic, mechanical and/or pneumatic control device.

According to a preferred feature of the invention, the restrictor slide has a longitudinal slot on the side facing the outflow element. This slot is sealed against the outside by a spring extending as far as the bore of the outflow element. The slot extends as far as the passage through the slide. This longitudinal slot ensures that the outflow cross-section of the passage is larger than its inflow cross-section in every position of the restrictor slide. It therefore helps to calm the flow.

An embodiment of the mixing head according to the invention is illustrated purely diagrammatically in the drawings and is described below.

DETAILED DESCRIPTION OF THE DRAWINGS

Figure 1:
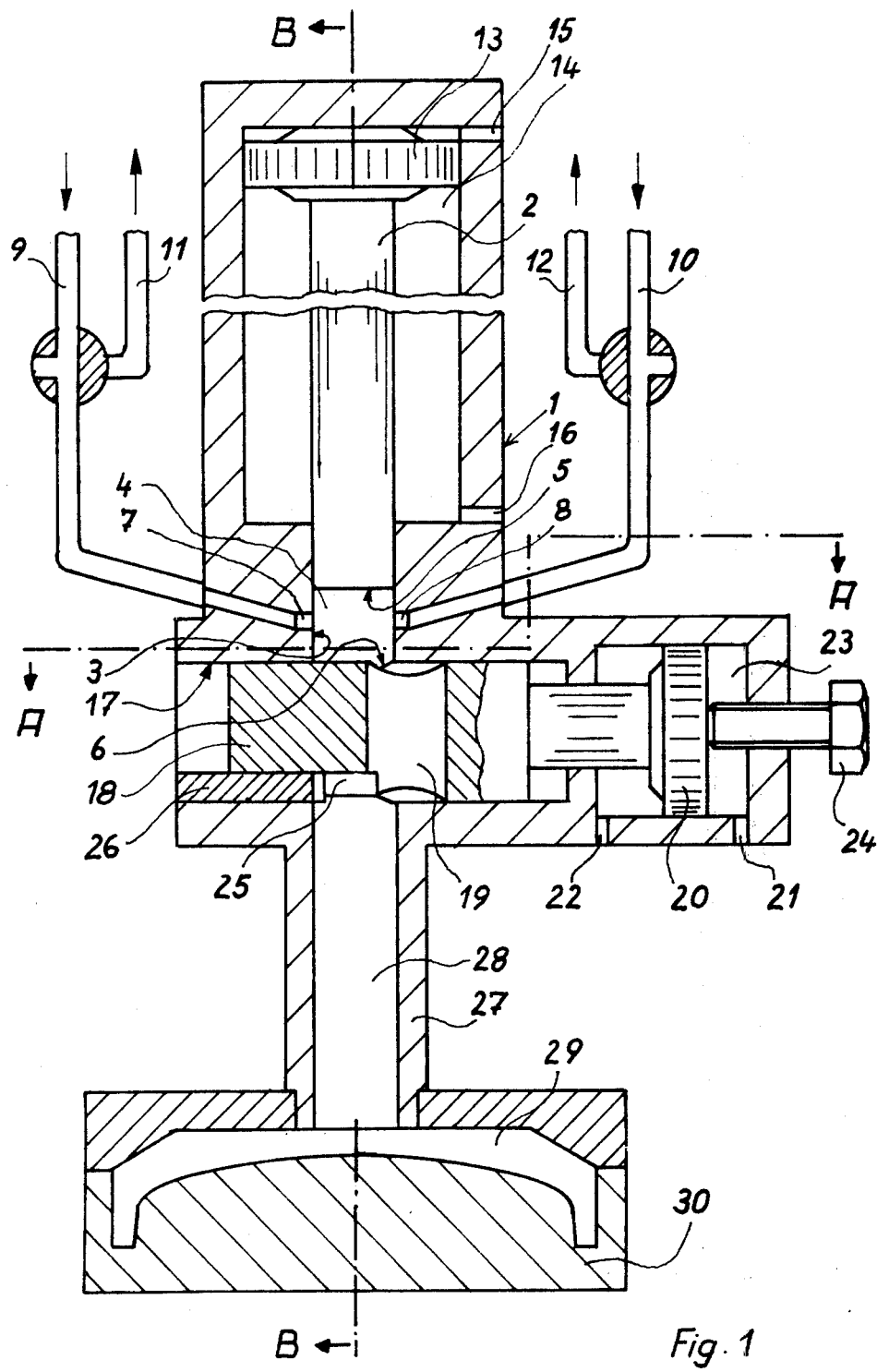
FIG. 1 shows a longitudinal section of the mixing head in the mixing position of the ejector piston and restrictor slide.
Figure 2:
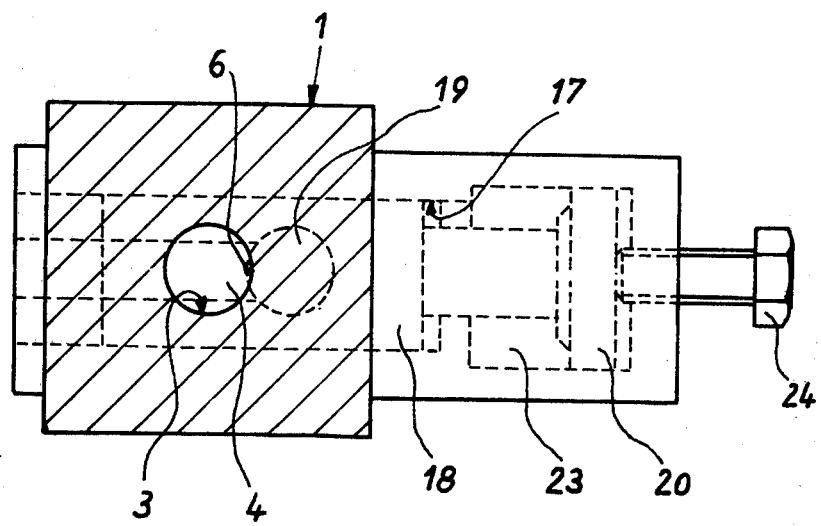
FIG. 2 shows a section through the mixing head taken along the line A—A of FIG. 1.
Figure 3:
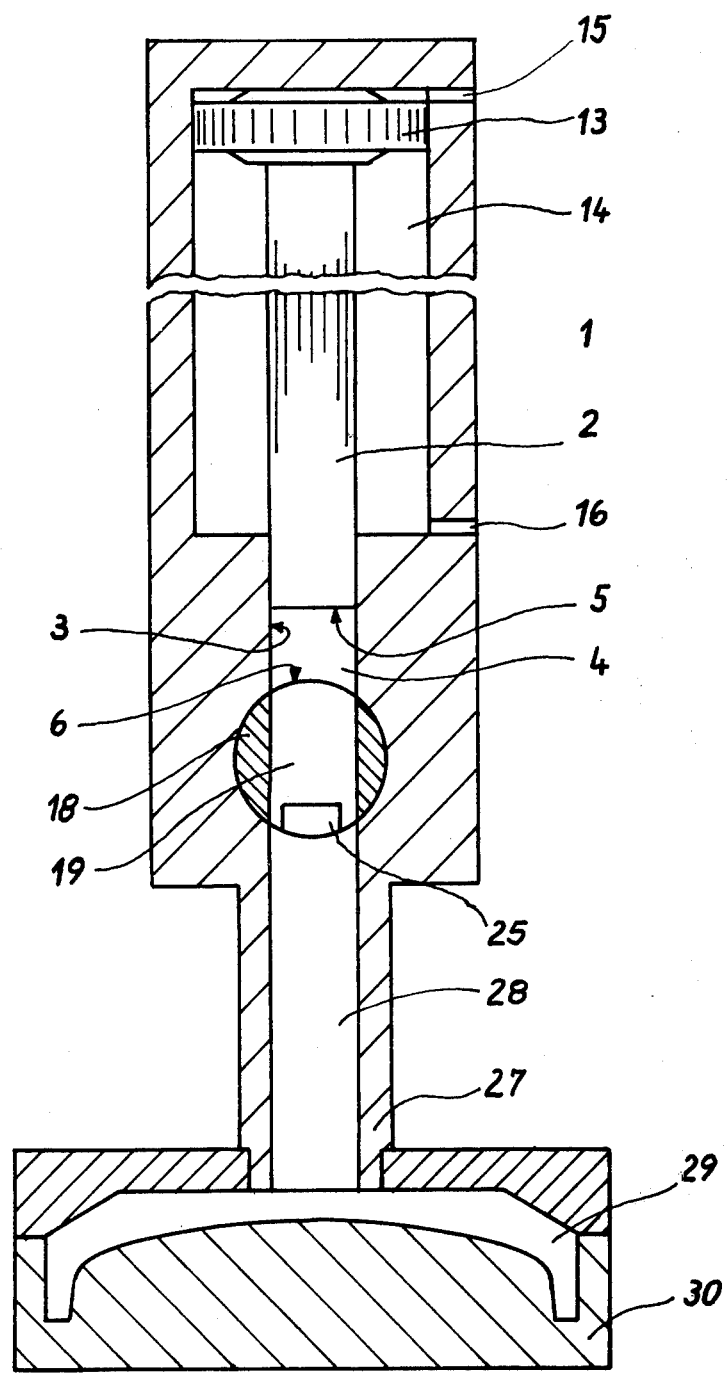
FIG. 3 shows a section through the mixing head along the line B—B in FIG. 1.
Figure 4:
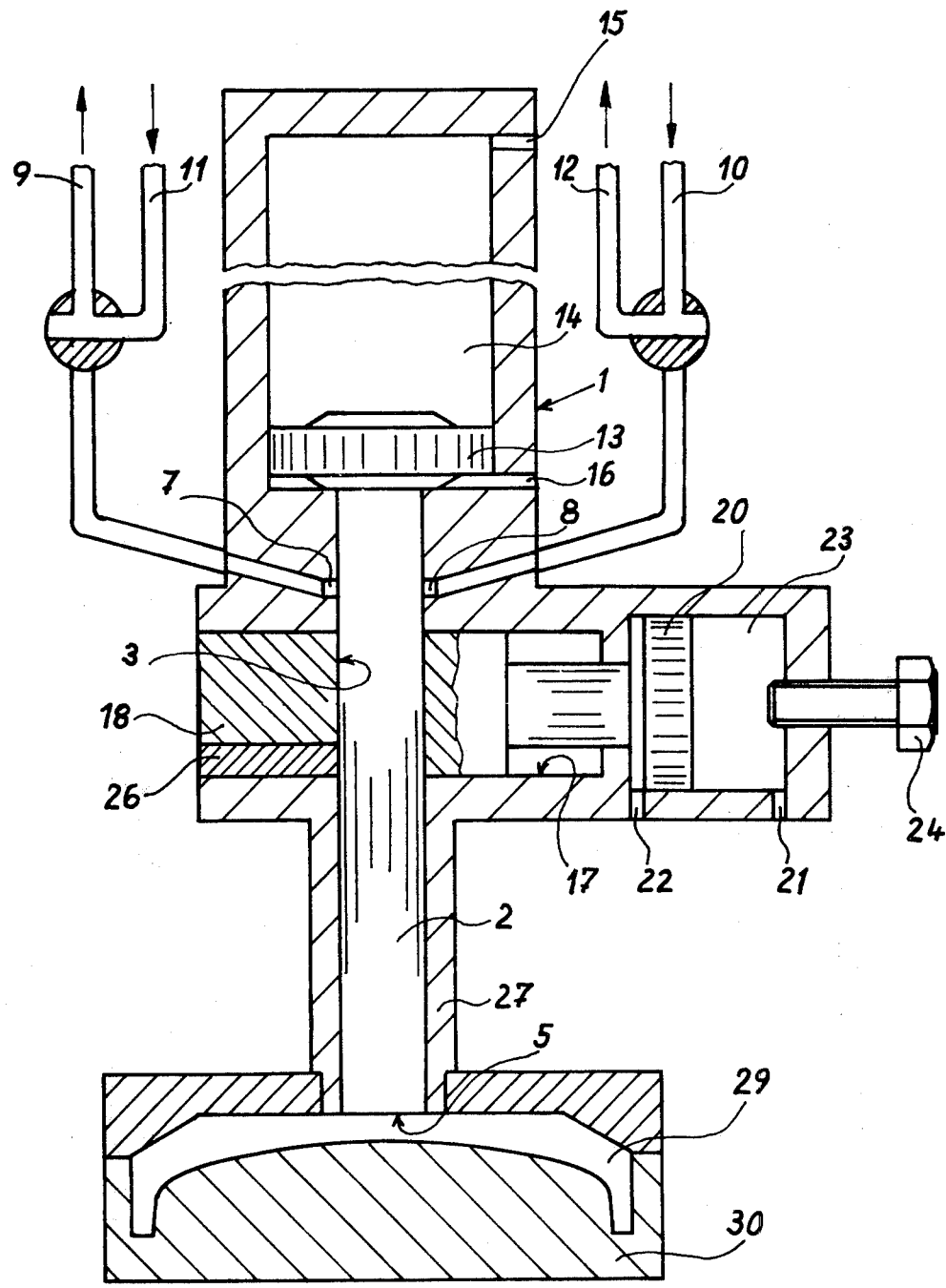
FIG. 4 shows the mixing head in longitudinal section, with the restrictor slide open to allow the ejector piston to move completely forwards to the outlet aperture of the outflow element.

An ejector piston 2 is slidably supported in a guide bore 3 in a housing 1. When the ejector 2 is withdrawn, part of the guide bore 3 forms a mixing chamber 4, one end of which is bounded by the end face 5 of the piston 2. An outlet aperture 6 of the mixing chamber is situated at the opposite end. Inlet apertures 7, 8 open into the mixing chamber from feed pipes 9, 10 supplying the components of the reaction mixture. Spill ducts are indicated at 11, 12. The ejector piston 2 is constructed at its other end as a double action hydraulic piston 13 guided in a hydraulic cylinder 14 which has connections 15, 16 for conduits.

A restrictor slide 18 is slidably guided in a bore 17 which is situated transversely and directly adjacent to the outlet aperture 6 of the mixing chamber 4. The slide 18 has a passage 19 whose cross-section is at least equal to that of the ejector piston 2. The passage 19 and guide bore 3 of the ejector piston 2 are arranged with their axes parallel. The restrictor slide 18 also has a double action hydraulic piston 20 at one end. This piston is displaceable inside a hydraulic cylinder 23 which has connections 21, 22 for pipes. The stroke of the restrictor slide 18 can be varied by means of a setting screw 24. The inlet and outlet cross-sections of the passage 19 increase and decrease according to the setting of the restrictor slide. The slide 18, in a preferred embodiment, has a longitudinal slot 25 on the side remote from the mixing chamber 4. This slot extends as far as the passage 19, and is sealed off from the outside by a spring 26. The outlet end of the passage 19 is adjacent to an outflow element 27 whose bore 28 is coaxial with the guide bore 3 of the ejector piston 2. The outflow element 27 opens directly into the cavity 29 of a mold 30.

Figure 5:
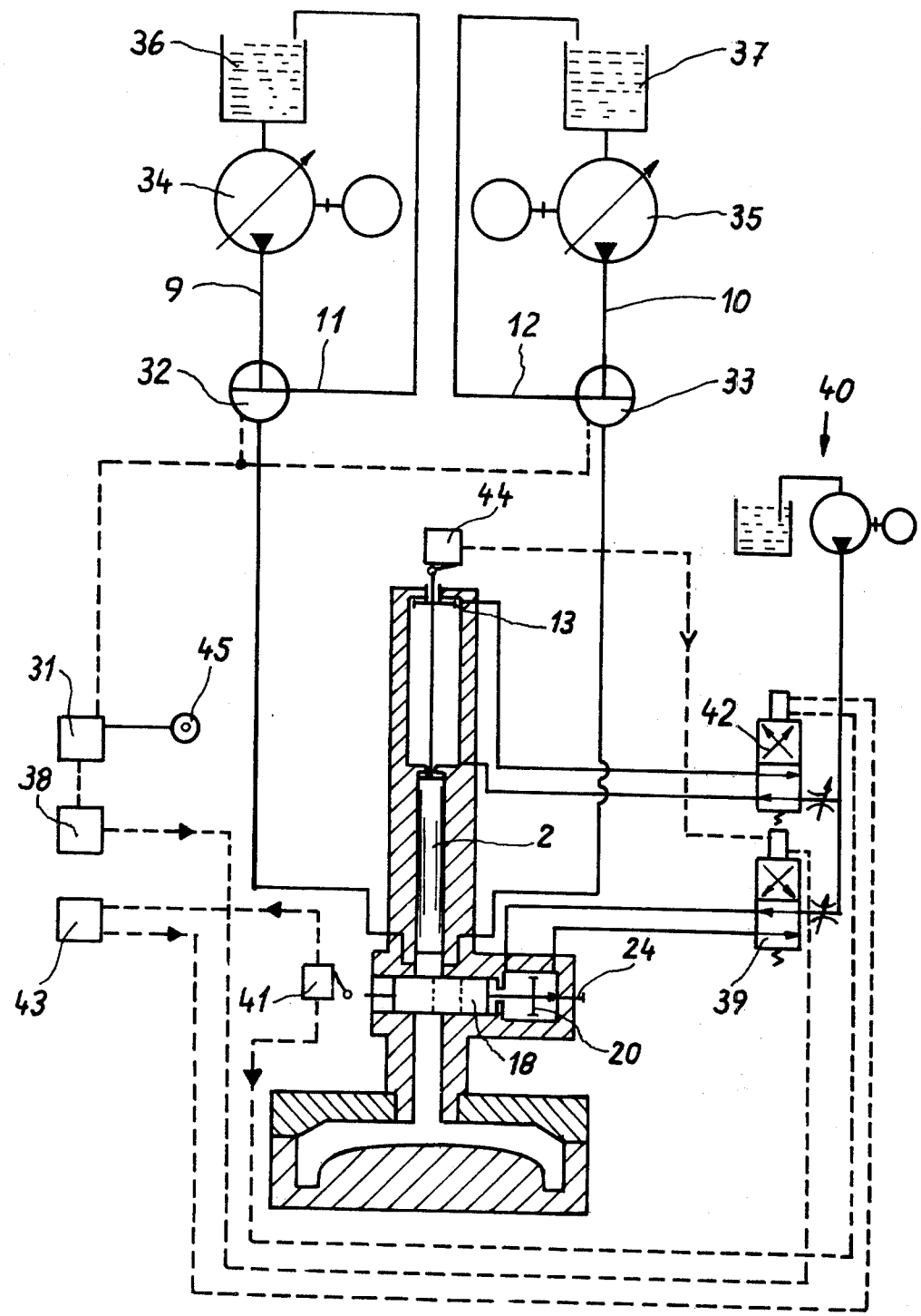
FIG. 5 shows the mixing head with control device for the ejector piston and the restrictor slide.

The mode of operation of the mixing head will now be explained with reference to the control diagram of FIG. 5:

On expiration of the injection time to which a timer 31 has been set, the timer 31 switches multi-way valves 32, 33 to the spill ducts 11, 12 so that the components which are delivered from the reservoirs 36, 37 to the feed pipes 9, 10 by means of the dosing pumps 34, 35 are returned to the reservoirs.

At the end of a given time interval, the timer 31 energizes another timer 38 which is adjusted to a delay of 3 seconds. The timer 38 then switches a multi-way valve 39 of the hydraulic control device 40. This actuates the hydraulic piston 20 of the restrictor slide 18 so that the slide 18 moves into the position for cleaning. At the same time, the slide 18 switches a limit switch 41 which switches the multi-way valve 42 of the hydraulic control device 40 so that the hydraulic piston 13 of the ejector piston 2 is actuated in the direction of the cleaning movement of the ejector piston 2. The limit switch 41 at the same time energizes another timer 43 which is adjusted to a delay of 3 seconds. After expiration of this interval, the said timer 43 switches the multi-way valve 42 so that the ejector piston 2 is returned to the mixing position. At the same time, the ejector piston 2 releases a limit switch 44 which switches the multi-way valve 39 so that the restrictor slide 18 resumes its position set by the setting screw 24. The mixing head is then ready for the next mixing operation. This operation is released by actuation of a limit switch 45 which releases the timer 31 which in turn immediately switches the multi-way valves 32, 33 to forward stroke so that the components enter the mixing chamber 4.

What is claimed is:

1. A mixing head for mixing at least two components which react with each other to form a foam, comprising a housing having a first guide bore for an ejector piston, a section of the first guide bore forming a mixing chamber into which inlet apertures for the components open, one end of the mixing chamber being bounded by the end face of the ejector piston when the piston is withdrawn, an outlet opening being situated at the opposite end of the mixing chamber, a restrictor slide slidable in a second guide bore, the second guide bore being adjacent the outlet of the mixing chamber and arranged transversely relative thereto, the restrictor slide having a passage therethrough, the cross-section of which is at least equal to the cross-section of the ejector piston, the passage connecting the mixing chamber to an outflow conduit in every position of the restrictor slide, the internal cross-section of the outflow conduit being at least equal to the cross-section of the ejector piston.

2. A mixing head as claimed in claim 1, wherein the stroke of the restrictor slide is adjustable.

3. A mixing head for mixing at least two components which react with each other to form a foam, comprising a housing having a first guide bore for an ejector piston, a section of the first guide bore forming a mixing chamber into which inlet apertures for the components open, one end of the mixing chamber being bounded by the end face of the ejector piston when the piston is withdrawn, an outlet opening being situated at the opposite end of the mixing chamber, a restrictor slide slidable in a second guide bore, the second guide bore being adjacent the outlet of the mixing chamber and arranged transversely relative thereto, the restrictor slide having a passage therethrough, the cross-section of which is at least equal to the cross-section of the ejector piston, the passage connecting the mixing chamber to an outflow conduit in every position of the restrictor slide, the internal cross-section of the outflow conduit being at least equal to the cross-section of the ejector piston, wherein the stroke of said restrictor slide is adjustable and has a longitudinal slot on its side facing the outflow conduit, which slot is sealed off against the outside by a spring extending as far as the bore of the outflow conduit, the slot itself extending as far as the passage through the restrictor slide.

4. A mixing head as claimed in claim 3, wherein movement of said ejector piston and said restrictor slide is controlled by means of a control device.

5. A mixing head for mixing at least two reactive components comprising: (A) a housing having
   (i) an ejector piston guide bore therein,
   (ii) a mixing chamber within said ejector piston guide bore and into which inlet apertures for said reactive components open, said mixing chamber further defined as having an outlet opening,
   (iii) a restrictor piston guide bore arranged transversely of said outlet opening,
   (iv) an outflow bore arranged transversely of said restrictor piston guide bore, and communicating with said outlet opening via said restrictor piston guide bore;
(B) an ejector piston slidably located in said ejector piston guide bore, and slidable through said mixing chamber, said restrictor piston guide bore, and said outflow bore;
(C) a restrictor piston slidably located in said restrictor piston guide bore and having a passage therethrough, said passage adapted to directly connect said outlet opening and said outflow bore, and said passage being of such a cross-section that said ejector piston can pass therethrough.

* * * * *